US012793902B2

(12) United States Patent
Matsuoka

(10) Patent No.: US 12,793,902 B2
(45) Date of Patent: Nov. 10, 2026

(54) LAMINATED CERAMIC CAPACITOR AND METHOD OF MANUFACTURING LAMINATED CERAMIC CAPACITOR

(71) Applicant: TAIYO YUDEN CO., LTD., Tokyo (JP)

(72) Inventor: Ayumi Matsuoka, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 112 days.

(21) Appl. No.: 18/743,981

(22) Filed: Jun. 14, 2024

(65) Prior Publication Data

US 2025/0006431 A1 Jan. 2, 2025

(30) Foreign Application Priority Data

Jun. 29, 2023 (JP) ................................ 2023-107446

(51) Int. Cl.

*H01G 4/30* (2006.01)
*H01G 4/008* (2006.01)
*H01G 4/12* (2006.01)
*H01G 4/40* (2006.01)

(52) U.S. Cl.

CPC ............... *H01G 4/30* (2013.01); *H01G 4/008* (2013.01); *H01G 4/1227* (2013.01); *H01G 4/129* (2013.01); *H01G 4/40* (2013.01)

(58) Field of Classification Search

CPC ........ H01G 4/30; H01G 4/008; H01G 4/1227; H01G 4/129; H01G 4/40

See application file for complete search history.

(56) References Cited

U.S. PATENT DOCUMENTS

| | | | | |
|---|---|---|---|---|
| 2010/0165542 | A1* | 7/2010 | Sohn | C03C 8/20 361/313 |
| 2012/0162858 | A1* | 6/2012 | Tanaka | H01G 4/1227 361/321.4 |
| 2016/0118191 | A1* | 4/2016 | Kanzaki | H01G 4/0085 361/301.4 |
| 2017/0025222 | A1* | 1/2017 | Park | H01G 4/1209 |
| 2020/0043657 | A1* | 2/2020 | Ariizumi | H01G 4/1218 |
| 2020/0312570 | A1* | 10/2020 | Hashimoto | H01G 4/1227 |
| 2022/0392704 | A1* | 12/2022 | Iguchi | H01G 4/008 |

FOREIGN PATENT DOCUMENTS

JP 2009-084111 A 4/2009

* cited by examiner

*Primary Examiner* — Michael P Mcfadden
(74) *Attorney, Agent, or Firm* — CUSHMAN PARTNERS LLC

(57) ABSTRACT

Provided is a laminated ceramic capacitor having a capacitance less reduced by a sintering agent. A laminated ceramic capacitor according to one aspect includes a body having first and second internal electrode layers and a ceramic layer disposed therebetween. The ceramic layer is formed from ceramic material containing a sintering agent composed mainly of a sintering agent element. The first internal electrode layer includes a first electrode part and a first non-electrode part. The second internal electrode layer includes a second electrode part and a second non-electrode part. The first and second non-electrode parts each have a segregated part containing the sintering agent element. In a cross-section of the body, a ratio of a second area to a first area is 35% or lower, the first area representing a sum of areas of the first and second internal electrode layers, the second area representing an area of the segregated part.

12 Claims, 8 Drawing Sheets

LAMINATED CERAMIC CAPACITOR AND METHOD OF MANUFACTURING LAMINATED CERAMIC CAPACITOR

CROSS-REFERENCE TO RELATED APPLICATIONS

This application is based on and claims the benefit of priority from Japanese Patent Application Serial No. 2023-107446 (filed on Jun. 29, 2023), the contents of which are hereby incorporated by reference in their entirety.

TECHNICAL FIELD

The disclosure herein relates mainly to a laminated ceramic capacitor and a method of manufacturing the laminated ceramic capacitor. The disclosure herein also relates to a circuit module with the laminated ceramic capacitor and an electronic device with the circuit module.

BACKGROUND

Laminated ceramic capacitors are used in various electronic devices. Laminated ceramic capacitors are produced by stacking lamination units each having an internal electrode pattern formed on the surface of a ceramic green sheet containing ceramic powder to form a green laminate, and then firing this green laminate. It is known that addition of a sintering agent to the ceramic green sheets can promote the sintering of the ceramic powder through a low-temperature firing process. Examples of known sintering agents include Si (silicon), which forms the liquid phase during the firing process. A conventional laminated ceramic capacitor produced with ceramic green sheets containing a sintering agent added thereto is disclosed in Japanese Patent Application Publication No. 2009-084111.

Since the relative permittivity of a sintering agent is lower than that of the main phase oxide (e.g., barium titanate) of the ceramic green sheets, the capacitance of the laminated ceramic capacitor is reduced as the amount of sintering agent added increases. On the other hand, if the amount of sintering agent added is small, the ceramic layers do not densify sufficiently when the green laminate is sintered at low temperatures.

SUMMARY

It is an object of the present disclosure to solve or alleviate at least part of the drawback mentioned above. One of more particular objects of the disclosure is to provide a laminated ceramic capacitor having a capacitance less reduced by a sintering agent.

Other objects of the disclosure will be made apparent through the entire description in the specification. The invention disclosed herein may also address drawbacks other than that grasped from the above description. When an advantageous effect of an embodiment is described herein, the advantageous effect suggests an object of the invention corresponding to the embodiment.

The various inventions disclosed herein may be simply referred to as "the invention". A laminated ceramic capacitor according to one aspect of the invention includes a body having a first internal electrode layer, a second internal electrode layer, and a ceramic layer disposed between the first internal electrode layer and the second internal electrode layer. The ceramic layer is formed from ceramic material containing a sintering agent composed mainly of a sintering agent element. A first external electrode is provided on the body so as to be electrically connected to the first internal electrode layer. A second external electrode is provided on the body so as to be electrically connected to the second internal electrode layer. The first internal electrode layer includes a first electrode part and a first non-electrode part, the first electrode part being formed of a sintered compact of the main component metal element, the first non-electrode part being surrounded by the first electrode part. The second internal electrode layer includes a second electrode part and a second non-electrode part, the second electrode part being formed of a sintered compact of the main component metal element, the second non-electrode part being surrounded by the second electrode part. Each of the first non-electrode part and the second non-electrode part has a segregated part containing the sintering agent element. In a cross section of the body cut along the lamination direction, a ratio of a second area to a first area is 35% or lower, the first area representing a sum of an area of the first internal electrode layer and an area of the second internal electrode layer, the second area representing an area of the segregated part.

Advantageous Effects

According to one embodiment of the invention disclosed herein, it is possible to provide a laminated ceramic capacitor having a capacitance less reduced by a sintering agent.

DESCRIPTION OF THE PREFERRED EMBODIMENTS

Figure 1:
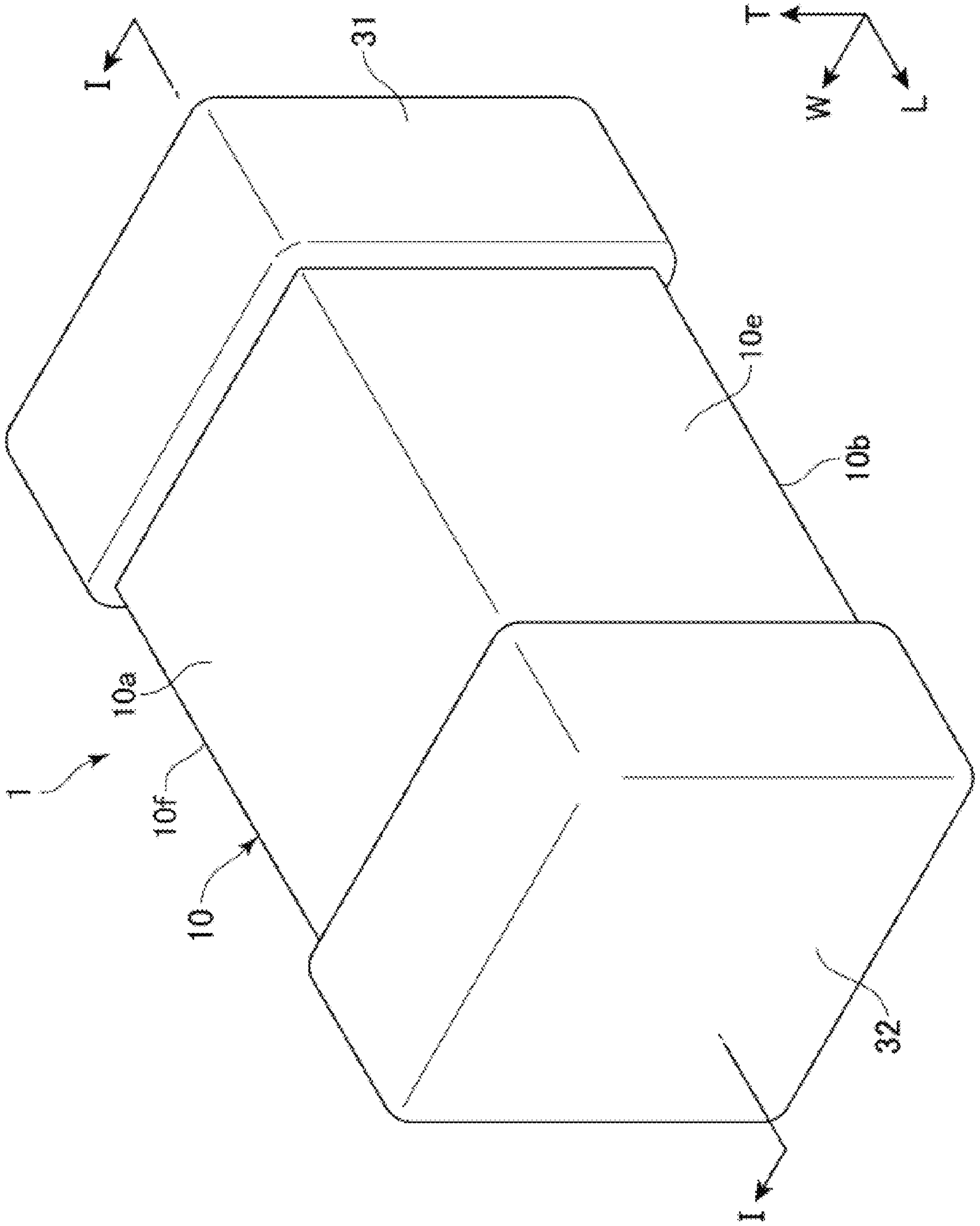
FIG. 1 is a perspective view schematically showing a laminated ceramic capacitor according to one embodiment of the disclosure.

Various embodiments of the disclosure will be described hereinafter with reference to the appended drawings. Throughout the drawings, the same components are denoted by the same or like reference numerals. For convenience of explanation, the drawings are not necessarily drawn to scale. The following embodiments of the disclosure do not limit the scope of the claims. The elements included in the following embodiments are not necessarily essential to solve the problem addressed by the invention.

For convenience of explanation, each of the drawings may show the L axis, the W axis, and the T axis orthogonal to one another. In this specification, the dimensions, arrangement, shape, and other features of each component of a laminated ceramic capacitor 1 may be described with reference to the L, W, and T axes.

(1) LAMINATED CERAMIC CAPACITOR 1

(1-1) Basic Structure of Laminated Ceramic Capacitor 1

Figure 2:
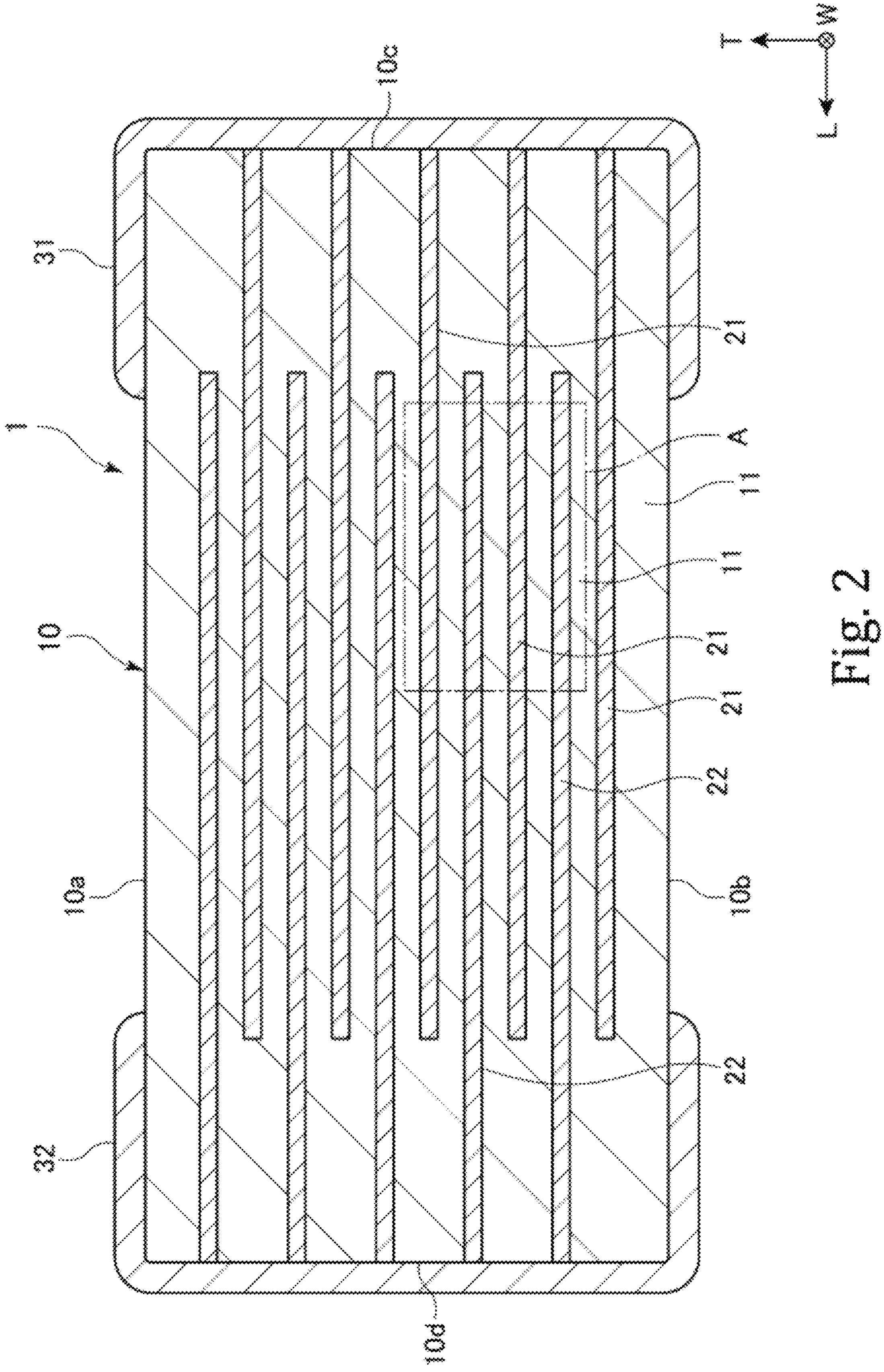
FIG. 2 is a sectional view schematically showing a section of the capacitor of FIG. 1 cut along the line I-I.

Referring to FIGS. 1 and 2, a description will now be given of the basic structure of a laminated ceramic capacitor 1 according to the first embodiment. FIG. 1 is a perspective view showing the laminated ceramic capacitor 1 according to the first embodiment. FIG. 2 is a sectional view schematically showing a section of the laminated ceramic capacitor 1 cut along the line I-I.

The laminated ceramic capacitor 1 has a body 10, a first external electrode 31 and a second external electrode 32 provided on the body 10. The first external electrode 31 is spaced apart from the second external electrode 32. In the example shown in FIG. 2, the first external electrode 31 is spaced apart from the second external electrode 32 in the L-axis direction.

The body 10 includes a plurality of ceramic layers 11, a plurality of first internal electrode layers 21, and a plurality of second internal electrode layers 22. A ceramic layer 11 is present between a first internal electrode layer 21 and a second internal electrode layer 22 adjacent to the first internal electrode layer 21. In this specification, the first internal electrode layers 21 and the second internal electrode layers 22 may be referred to collectively as "the internal electrode layers" when it is not necessary to distinguish the first internal electrode layers 21 and the second internal electrode layers 22 from each other.

The body 10 has a top surface 10*a*, a bottom surface 10*b*, a first end surface 10*c*, a second end surface 10*d*, a first side surface 10*e*, and a second side surface 10*f*. The outer surface of the body 10 is defined by the top surface 10*a*, the bottom surface 10*b*, the first end surface 10*c*, the second end surface 10*d*, the first side surface 10*e*, and the second side surface 10*f*.

The top surface 10*a* and the bottom surface 10*b* form the opposite ends of the body 10 in the height direction (T-axis direction). In other words, the top surface 10*a* and the bottom surface 10*b* are opposed to each other in the T-axis direction. The first end surface 10*c* and the second end surface 10*d* form the opposite ends of the body 10 in the length direction (L-axis direction). In other words, the first end surface 10*c* and the second end surface 10*d* are opposed to each other in the L-axis direction. The first side surface 10*e* and the second side surface 10*f* form the opposite ends of the body 10 in the width direction (W-axis direction). In other words, the first side surface 10*e* and the second side surface 10*f* are opposed to each other in the W-axis direction. The top surface 10*a* and the bottom surface 10*b* are separated from each other by a distance equal to the height of the body 10, the first end surface 10*c* and the second end surface 10*d* are separated from each other by a distance equal to the length of the body 10, and the first side surface 10*e* and the second side surface 10*f* are separated from each other by a distance equal to the width of the body 10.

The body 10 is composed of the ceramic layers 11, the first internal electrode layers 21, and the second internal electrode layers 22 stacked together along the lamination direction. In the illustrated embodiment, the ceramic layers 11, the first internal electrode layers 21, and the second internal electrode layers 22 are stacked together along the T-axis direction. The lamination direction may be along the Taxis, as shown in the drawings, or may be along the L or W axis. The ceramic layers 11 located at the opposite ends in the lamination direction may be referred to as cover layers.

In the illustrated embodiment, the body 10 is constituted by the ceramic layers 11, the first internal electrode layers 21, and the second internal electrode layers 22 stacked together along the T-axis direction. Therefore, the T-axis direction may be referred to as the lamination direction. An upper cover layer may be provided on the top surface of the laminate. A lower cover layer may be provided on the bottom surface of the laminate. The upper cover layer and the lower cover layer may be formed of the same material as the ceramic layers 11. The upper cover layer and the lower cover layer may be a part of the body 10.

Each of the first internal electrode layers 21 has one end led toward the outside of the body 10. The first internal electrode layer 21 is connected to the first external electrode 31 provided on the surface of the body 10. Each of the second internal electrode layers 22 has one end led toward the outside of the body 10. The second internal electrode layer 22 is connected to the second external electrode 32 provided on the surface of the body 10. In the illustrated embodiment, the first internal electrode layer 21 is led from one end in the L-axis direction toward the outside of the body 10. The first internal electrode layer 21 is connected to the first external electrode 31 at one end of the body 10 in the L-axis direction. The second internal electrode layer 22 is led from the other end in the L-axis direction toward the outside of the body 10. The second internal electrode layer 22 is connected to the second external electrode 32 at the other end of the body 10 in the L-axis direction. In the example shown in FIG. 2, the first and second internal electrode layers 21 and 22 are led out to the first and second end surfaces 10*c* and 10*d*, respectively, but the first and second internal electrode layers 21 and 22 can be led out through various surfaces of the body 10 in accordance with the locations and the shapes of the first and second external electrodes 31 and 32. For example, if both the first and second external electrodes 31 and 32 are located on the bottom surface 10*b*, both the first and second internal electrode layers 21 and 22 are led out through the bottom surface. The first and second external electrodes 31 and 32 may be located on any of the surfaces of the body 10 as long as they are separated from each other.

When voltage is applied between the first and second external electrodes 31 and 32, capacitance is generated between the first and second internal electrode layers 21 and 22.

FIG. 2 shows five each of the first and second internal electrode layers 21 and 22 for simplicity of illustration, but the laminated ceramic capacitor 1 may include any number of layers stacked together. The laminated ceramic capacitor 1 may include, for example, 300 to 1000 layers formed of the first and second internal electrode layers 21 and 22. In other words, the number of stacked layers in the laminated ceramic capacitor 1 may be 300 to 1000.

The laminated ceramic capacitor 1 may be mounted on an electronic circuit board (not shown). The electronic circuit board having the laminated ceramic capacitor 1 mounted thereon may be referred to as a circuit module. Various electronic components other than the laminated ceramic capacitor 1 may also be mounted on the circuit module. The circuit module may be installed in various electronic devices. The electronic devices in which the circuit module can be installed include smartphones, tablets, game consoles, electrical components of automobiles, servers, and various other electronic devices.

In one aspect, the body 10 may be configured to have a rectangular parallelepiped shape. The term "rectangular parallelepiped" or "rectangular parallelepiped shape" used herein is not intended to mean solely "rectangular parallelepiped" in a mathematically strict sense. As described later, the corners and/or edges of the body 10 may be rounded. The dimensions and the shape of the body 10 are not limited to those specified herein.

In one aspect, the laminated ceramic capacitor 1 has a dimension in the L axis direction (length) of 0.2 mm to 2.5 mm, a dimension in the W axis direction (width) of 0.1 mm to 3.5 mm, and a dimension in the T axis direction (height) of 0.1 mm to 3.0 mm. In one aspect, the length of the laminated ceramic capacitor 1 may be larger than the width thereof. In one aspect, the height of the laminated ceramic capacitor 1 may be larger than the width thereof. In one aspect, the width of the laminated ceramic capacitor 1 may be larger than the length thereof.

(1-2) First Internal Electrode Layers 21 and Second Internal Electrode Layers 22

(1-2-1) Composition of First Internal Electrode Layers 21 and Second Internal Electrode Layers 22

In one aspect, the first internal electrode layers 21 contain a base metal such as Ni (nickel), Cu (copper), and Sn (tin), as the main component thereof. A component that is at least 50 wt % of the first internal electrode layers 21 with reference to the total mass of the first internal electrode layers 21 can be regarded as the main component of the first internal electrode layers 21. The first internal electrode layers 21 preferably contain 60 wt % or more, 70 wt % or more, 80 wt % or more, or 90 wt % or more the base metal as the main component thereof.

The first internal electrode layers 21 can contain secondary elements in addition to the main component metal element. The first internal electrode layer 21 contains elements that easily form compounds with a sintering agent element contained in a sintering agent (described later) added to the raw material of the ceramic layer 11 The secondary elements that can be contained in the first inner electrode layer 21 are one or more elements selected from the group consisting of Al (aluminum), Zn (zinc), B (boron), and Si (silicon), for example.

In one aspect, the internal electrode layers can contain 0.01 at % to 5 at % the secondary elements relative to 100 at % the main component metal element. When the internal electrode layers contain two or more elements as secondary elements, the total concentration of these two or more secondary elements is 0.01 at % to 5 at %.

The description of the components of the first internal electrode layers 21 also applies to the components of the second internal electrode layers 22.

In an aspect, the thickness (the dimension in the T-axis direction) of the first internal electrode layers 21 is 0.1 μm to 2 μm. In one aspect, the thickness of the first internal electrode layers 21 is preferably 0.4 μm or less. The description of the thickness of the first internal electrode layers 21 also applies to the thickness of the second internal electrode layers 22.

(1-2-2) Electrode Part and Non-Electrode Part

Figure 3:
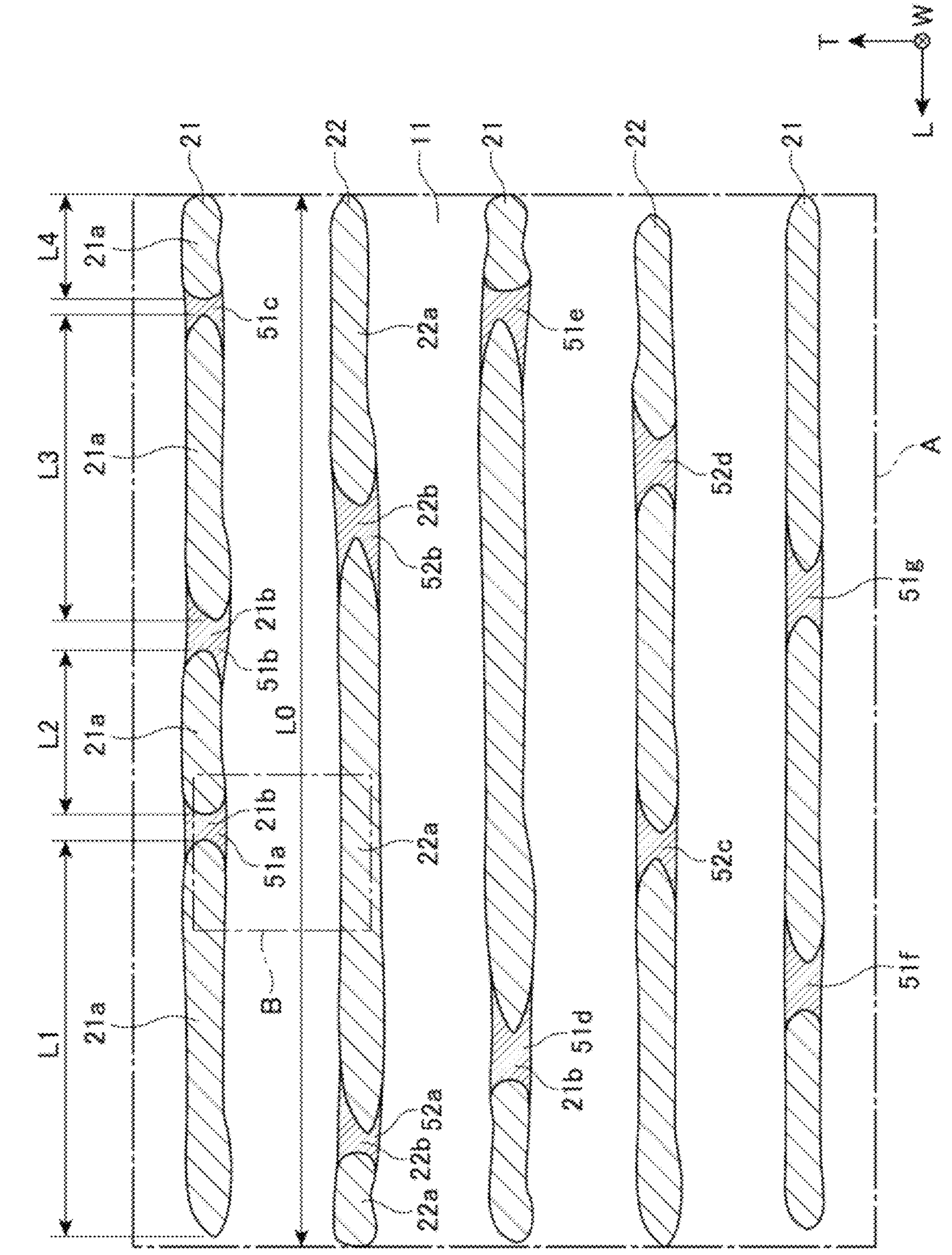
FIG. 3 is an enlarged sectional view showing, on an enlarged scale, a part (region A) of the section shown in FIG. 2.

The internal electrode layers will be further described with reference to FIG. 3. FIG. 3 is an enlarged cross-sectional view showing, on an enlarged scale, a region A of the cross-section of the body 10 shown in FIG. 2. The region A has a dimension L0 of about 50 μm in the L-axis direction. As shown in FIG. 3, each of the first internal electrode layers 21 includes a first electrode part 21*a* containing a main component metal element, and first non-electrode parts 21*b* surrounded by the first electrode part 21*a*. The first internal electrode layer 21 may include a plurality of first non-electrode parts 21*b*. The first electrode part 21*a* contains a sintered compact of the main component metal element. Therefore, the first electrode part 21*a* is highly conductive. As shown in FIG. 3, the first electrode part 21*a* of the first internal electrode layer 21 is observed in the cross-section cut along the lamination direction (the T-axis direction in FIG. 3) to be divided into multiple portions separated by the first non-electrode parts 21*b*.

The first non-electrode parts 21*b* are interposed between the first electrode parts 21*a* adjacent to each other in the L-axis direction and has a higher insulation quality than the first electrode parts 21*a*. Conventional laminated ceramic capacitors also contain high insulation regions having a high insulation quality in the internal electrode layers. Most part of the highly insulating regions in the internal electrodes of conventional laminated ceramic capacitors is occupied by a portion of the ceramic layer and/or voids. By contrast, as will be described later, the first non-electrode parts 21*b* in the present invention contain a secondary phase formed by the solidification of a liquid-phase sintering agent that flowed to the regions between the first electrode parts 21*a* during the manufacturing process of the laminated ceramic capacitor 1. Therefore, the first non-electrode parts 21*b* contain the sintering agent element contained in the sintering agent. A portion of the first non-electrode parts 21*b* may be occupied by oxides of the secondary element, a portion of the ceramic layer 11, and/or voids.

As will be described in detail later, the first internal electrode layer 21 is formed by firing an internal electrode pattern containing the main component metal element. As the sintering of the main component metal element progresses in this firing process, the shape of the sintered compact particles of the main component metal element approximates a sphere. In the firing process, as the shape of the sintered compact particles of the main component metal element approximates a sphere, voids are created between adjacent sintered compact particles of the main component metal element. In conventional laminated ceramic capacitors, voids are created between the sintered compact particles of the main component metal element, before the sintering of ceramic layers proceeds, and thus a portion of the sintered ceramic layers penetrates into the voids between the sintered compact particles of the main component metal element. Therefore, in conventional laminated ceramic capacitors, a highly insulating region is included between the sintered compact particles of the main component metal element in the internal electrode layers, and most part of the highly insulating region is occupied by a portion of the ceramic layer and/or voids. By contrast, as for the laminated ceramic capacitor 1 described herein, the softened liquid-phase sintering agent can penetrate into the voids between the sintered compact particles of the main component metal element, before the sintered ceramic layer penetrates into the voids formed between the sintered compact particles of the main component metal element, during the firing in the manufacturing process.

In one aspect, the continuity of the internal electrode layers in the laminated ceramic capacitor 1 is preferably 75% or higher. The continuity should preferably be 80% or higher, or more preferably 90% or higher. The continuity of the first internal electrode layer 21 can be calculated as follows. First, the laminated ceramic capacitor 1 is polished so that an LT surface can be observed. Next, the region A included in this observation surface is observed under an SEM (scanning electron microscope), and regions that appear bright in this SEM image by contrast difference are identified as the first electrode parts 21*a*. The lengths of the first electrode parts 21*a* (the lengths along the L-axis direction in the example shown) are measured, and the measured lengths L1, L2, . . . , Ln are totaled. The total length of the first electrode parts 21*a* in the region A is divided by the length L0 of the measured region (i.e., (L1+L2+ . . . . Ln)/L0), and the resulting value can be defined as the continuity of one first internal electrode layer 21. The body 10 contains a plurality of first internal electrode layers 21, and the continuity can vary among the plurality of first internal electrode layers 21. Thus, ten different first internal electrode layers 21 can be selected, and the average of the continuities calculated for each of these selected first internal electrode layers 21 can be defined as the continuity of the first internal electrode layers 21 in the laminated ceramic capacitor 1.

As with the first internal electrode layers 21, each of the second internal electrode layers 22 can include electrode parts containing the main component metal element, and non-electrode parts surrounded by the electrode parts. Specifically, as shown in FIG. 3, each of the second internal electrode layers 22 includes second electrode parts 22*a* containing a main component metal element, and second non-electrode parts 22*b* surrounded by the second electrode parts 22*a*. The second internal electrode layer 22 may include a plurality of second non-electrode parts 22*b*. The second non-electrode parts 22*b* contain a secondary phase formed by the solidification of a liquid-phase sintering agent that flowed to the regions between the second electrode parts 22*a* during the manufacturing process of the laminated ceramic capacitor 1. The continuity of the second internal electrode layers 22 is defined in the same way as the continuity of the first internal electrode layers 21. Further, the average of the continuity of the first internal electrode layers 21 and the continuity of the second internal electrode layers 22 can be defined as the continuity of the internal electrode layers in the laminated ceramic capacitor 1.

In the laminated ceramic capacitor 1, capacitance is generated in the regions where the first electrode parts 21*a* of the first internal electrode layers 21 and the second electrode parts 22*a* of the second internal electrode layers 22 are opposed to each other in the lamination direction, or the T-axis direction in the illustrated embodiment. Conversely, the first non-electrode parts 21*b* and the second non-electrode parts 22*b* do not generate capacitance. Therefore, in order to provide the laminated ceramic capacitor 1 with a high capacitance, the continuity of the internal electrode layers should desirably be higher. In one aspect, the continuity of the internal electrode layers is 75% or higher. The continuity of the internal electrode layers should preferably be 80% or higher, or more preferably 90% or higher. With a higher continuity of the internal electrode layers, the capacitance of the laminated ceramic capacitor 1 can be improved.

In the length direction of the cross-section of the internal electrode layers, or the L-axis direction in the illustrated embodiment, the first non-electrode parts 21*b* are interposed between the first electrode parts 21*a* that generate capacitance in the laminated ceramic capacitor 1. Similarly, in the length direction of the cross-section of the internal electrode layers, or the L-axis direction in the illustrated embodiment, the second non-electrode parts 22*b* are interposed between the second electrode parts 22*a* that generate capacitance in the laminated ceramic capacitor 1. Noting the arrangement of the first non-electrode parts 21*b* relative to the first electrode parts 21*a* and the arrangement of the second non-electrode parts 22*b* relative to the second electrode parts 22*a* as described above, the first non-electrode parts 21*b* and/or the second non-electrode parts 22*b* are herein referred to as the "regions between the internal electrodes."

(1-3) Ceramic Layers 11

(1-3-1) Composition of Ceramic Layers 11

The ceramic layers 11 contain as a main component thereof a crystal of ceramic material represented by the chemical formula $ABO_3$. In other words, the ceramic layers 11 contain as a main phase a crystal of the oxide represented by the chemical formula $ABO_3$. The oxide may have a perovskite structure. A component that is at least 50 wt % of the ceramic layers 11 with reference to the total mass of the ceramic layers 11 can be regarded as the main component of the ceramic layers 11. When the ceramic layers 11 contain 50 wt % or more the oxide represented by the chemical formula $ABO_3$, the ceramic layers 11 can be considered to contain the oxide represented by the chemical formula $ABO_3$ as the main component thereof. The ceramic layers 11 preferably contain at least 60 wt %, 70 wt %, 80 wt %, or 90 wt % the oxide represented by the chemical formula $ABO_3$.

In the chemical formula $ABO_3$, "A" is at least one element selected from the group consisting of Ba (barium), Sr (strontium), Ca (calcium), and Mg (magnesium). In the chemical formula $ABO_3$, "B" is at least one element selected from the group consisting of Ti (titanium), Zr (zirconium), and Hf (hafnium). When the oxide represented by the chemical formula $ABO_3$ has a perovskite structure, elements "A" and "B" are located at the A site and the B site of the perovskite structure, respectively. Examples of the oxides contained in the ceramic layers 11 as a main component include $BaTiO_3$ (barium titanate), $CaZrO_3$ (calcium zirconate), $CaTiO_3$ (calcium titanate), $SrTiO_3$ (strontium titanate), and $MgTiO_3$ (magnesium titanate).

The oxide contained in the ceramic layers 11 as the main component may be an oxide represented by the chemical formula $Ba_{1-x-y}Ca_xSr_yTi_{1-z}Zr_zO_3$ ($0 \leq x \leq 1$, $0 \leq y \leq 1$, $0 \leq z \leq 1$). Examples of this type of oxide include strontium barium titanate, calcium barium titanate, barium zirconate, barium zirconate titanate, calcium zirconate titanate, and calcium barium zirconate titanate.

The ceramic layers 11 may contain one or more additive elements in addition to the main component oxide. In one aspect, the one or more additive elements contained in the ceramic layers 11 are selected from the group consisting of Fe, Ni, Mo, Nb (niobium), Ta (tantalum), W, Mg, Mn (manganese), V (vanadium), and Cr. The ceramic layers 11 may contain two or more of the above additive elements.

The ceramic layers 11 may contain oxides of rare earth elements in addition to the main component oxide. The oxides of rare earth elements contained in the ceramic layers 11 may be oxides of at least one rare earth element selected from the group consisting of Y (yttrium), Sm (samarium), Eu (europium), Gd (gadolinium), Tb (terbium), Dy (dysprosium), Ho (holmium), Er (erbium), Tm (thulium), and Yb (ytterbium). The ceramic layers 11 may contain oxides of two or more rare earth elements.

The ceramic layers 11 may contain yet another type of oxide. The ceramic layer 11 may contain oxides of at least one element selected from the group consisting of, for example, Co, Ni (nickel), Na (sodium), and K (potassium). The ceramic layers 11 may contain oxides of two or more of these elements.

In one aspect, the thickness (the dimension in the T-axis direction) of the ceramic layers 11 is 0.2 to 10 μm.

(1-3-2) Crystal Grains

Figure 4:
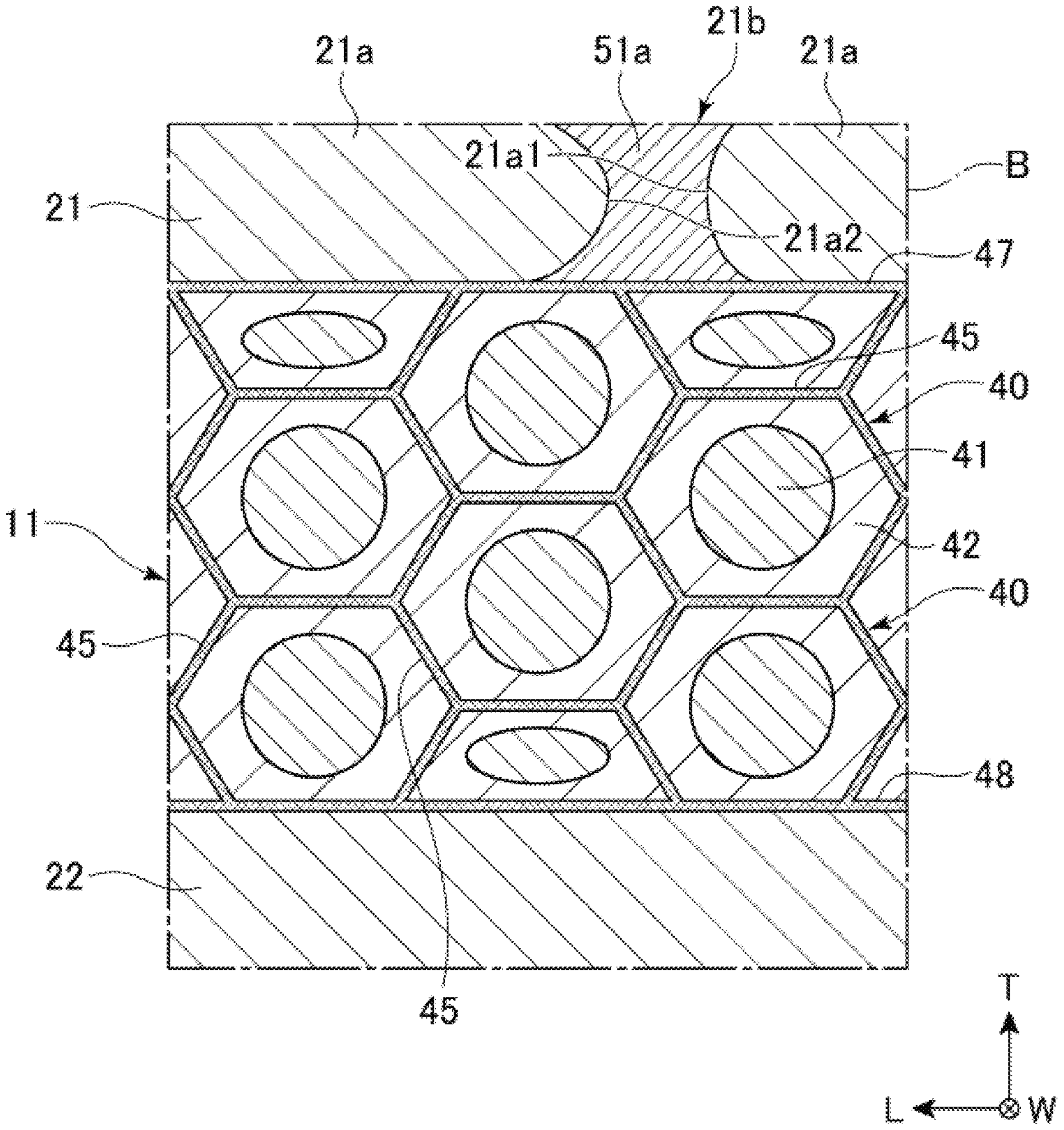
FIG. 4 is an enlarged sectional view showing, on an enlarged scale, a part (region B) of the section shown in FIG. 2.

The ceramic layers 11 contain a plurality of crystal grains of ceramic material (ceramic grains). In other words, the ceramic layer 11 is a polycrystalline body containing a plurality of crystal grains 40. At least a part of the plurality of crystal grains has a core-shell structure. With further reference to FIG. 4, a description will now be given of the crystal grains contained in the ceramic layers 11. FIG. 4 is an enlarged sectional view showing, on an enlarged scale, a region B of the section of the body 10 shown in FIG. 3, and FIG. 4 schematically shows a section of one of the crystal grains. The region B extends from the first internal electrode layer 21 through the ceramic layer 11 to the second internal electrode layer 22.

As shown in FIG. 4, the ceramic layer 11 contains a plurality of crystal grains 40.

In the illustrated embodiment, each of the crystal grains 40 has a core portion 41 and a shell portion 42. The elements (e.g., rare earth elements) added to the ceramic layer 11 are solid-solved more in the shell portion 42 than in the core portion 41. The core portion 41 and the shell portion 42 are identified by contrast differences in the mapping image obtained by STEM-EDS, for example. As described above, the additive elements contained in the ceramic layer 11 are solid-solved more in the shell portion 42 than in the core portion 41, and thus the region in the observation field where a large amount of these additive elements are detected can be identified as the shell portion 42.

Adjacent ones of the crystal grains 40 are separated from each other by grain boundaries 45. The ceramic layer 11 contains a plurality of crystal grains 40 with atoms regularly arranged, and grain boundaries 45 interposed between adjacent ones of the plurality of crystal grains 40. As shown, the number of crystal grains 40 interposed between a first internal electrode layer 21 and a second internal electrode layer 22 adjacent to the first internal electrode layer 21 may be three or less. A high capacitance can be obtained by reducing the number of crystal grains 40 interposed between the first internal electrode layer 21 and the second internal electrode layer 22. A first interface layer 47 is provided between the first internal electrode layer 21 and some of the plurality of crystal grains 40 adjacent to the first internal electrode layer 21. Also, a second interface layer 48 is provided between the second internal electrode layer 22 and some of the plurality of crystal grains 40 adjacent to the second internal electrode layer 22.

In the manufacture of the laminated ceramic capacitor 1, a sintering agent is added to the ceramic green sheet, which is the precursor of the ceramic layer 11, and a predetermined number of lamination units, each having the ceramic green sheet and an internal electrode pattern containing a main component metal element such as Ni formed on the surface of the ceramic green sheet, are stacked together to form a green laminate. This green laminate is fired to produce the laminated ceramic capacitor 1. Through firing of the green laminate, the ceramic green sheets form the ceramic layers 11, and the internal electrode patterns form the first internal electrode layers 21 and the second internal electrode layers 22. During firing, the sintering agent forms the liquid phase, and the elements of the raw powder contained in the ceramic green sheets are eluted into this liquid phase, and these eluted elements precipitate onto the crystal, thereby promoting the growth of crystal grains 40. In addition, the rearrangement of crystal grains 40 is promoted in the liquid phase, which densifies the ceramic layers 11. The sintering agent may be a low-melting glass. The low-melting glass used as the sintering agent may contain, for example, $SiO_2$, $B_2O_3$ and mixtures of these. Various low-melting glasses can be used as the sintering agent. Examples of low-melting glasses that can be used as the sintering agent include borosilicate glass and phosphate glass. Powder of $B_2O_3$ or $P_2O_5$ or a mixture of these powders may be used as the sintering agent. Elements other than oxygen contained in the sintering agent may be herein referred to as "sintering agent elements." For example, if a low-melting glass containing $SiO_2$ is used as the sintering agent, Si is the sintering agent element. Si, B, and P are examples of sintering agent elements.

Adding a sufficient amount of sintering agent to the ceramic green sheets promotes the sintering of the raw powder contained in the ceramic green sheets and the densification of the crystal grains 40, even when the ceramic green sheets are fired at a low temperature (e.g., at or below 1100° C.).

The grain boundaries 45, the first interface layer 47, and the second interface layer 48 contain a secondary phase formed by the solidification of the sintering agent having formed a liquid phase during firing, and oxides of elements in the main phase oxide (main component oxide) that constitute the ceramic layers 11. For example, if the main component oxide of the ceramic layers 11 is barium titanate, the grain boundaries 45, the first interface layer 47, and the second interface layer 48 contain the secondary phase, oxide of titanium ($TiO_2$), and oxide of barium (BaO).

(1-4) Segregated Parts

Segregated parts may precipitate on the first non-electrode parts 21*b* and the second non-electrode parts 22*b*. In the example shown in FIG. 3, the segregated parts 51*a*, 51*b*, 51*c*, 51*d*, 51*e*, 51*f*, 51*g* have precipitated in the first non-electrode parts 21*b*, and the segregated parts 52*a*, 52*b*, 52*c*, 52*d* have precipitated in the second non-electrode parts 22*b*. The segregated parts 51*a*, 51*b*, 51*c*, 51*d*, 51*e*, 51*f*, 51*g* and the segregated parts 52*a*, 52*b*, 52*c*, 52*d* are all formed by the solidification of the liquid-phase sintering agent that has flown into the first non-electrode parts 21*b* or the second non-electrode parts 22*b* in the manufacturing process of the laminated ceramic capacitor 1. In this specification, when it is not necessary to distinguish the segregated parts 51*a*, 51*b*, 51*c*, 51*d*, 51*e*, 51*f*, 51*g* and the segregated parts 52*a*, 52*b*, 52*c*, 52*d* from each other, they are collectively called "the segregated parts".

As mentioned above, the first and second internal electrode layers 21 and 22 (and their precursors, the internal electrode patterns) contain a secondary element (e.g., Al) that easily forms compounds with the main component of the sintering agent added to the raw material of the ceramic layers 11, and thus the liquid-phase sintering agent tends to flow from the ceramic green sheets, which are the precursor of the ceramic layers 11, into the first non-electrode parts 21*b*. Therefore, in the laminated ceramic capacitor 1, the segregated parts containing the sintering agent element, which have not been seen in conventional laminated ceramic capacitors, precipitate in the first non-electrode parts 21*b* and the second non-electrode parts 22*b*.

As described above, the segregated parts are formed by the solidification of the liquid-phase sintering agent and thus contain the sintering agent element. In one aspect, the concentration of the sintering agent element in the segregated parts is 20 at % or higher. In this specification, unless otherwise explained or unless the context requires otherwise, the concentration of the sintering agent element refers to the atomic number ratio (at %) of the sintering agent element in the observation region relative to the elements entering the B site of the main phase of the ceramic layer 11 (e.g., Ti element) taken at 100 at %. Therefore, the concentration in the segregated parts is expressed as the atomic number ratio of the sintering agent element to 100 at % of the B-site elements determined by quantifying the B-site elements and the sintering agent element present in the segregated parts in the observation region including the segregated parts. For example, when barium titanate is used as the main component oxide of the ceramic layer 11 and a low-melting glass containing $SiO_2$ is used as the sintering agent, the atomic number ratio of Si element to 100 at % of Ti element contained in the segregated parts is taken as the concentration of the sintering agent element in the segregated parts. The average of the concentrations quantified at ten locations within the segregated parts may be taken as the concentration in the segregated parts contained in the body 10.

The segregated parts may contain secondary elements contained in the first and second internal electrode layers 21 and 22. As described above, the first internal electrode layer 21 and the second internal electrode layer 22 contain an element as the secondary element that easily forms compounds with the main component of the sintering agent. Therefore, the secondary element is eluted from the first internal electrode layer 21 and the second internal electrode layer 22 into the liquid phase that has flown into the first non-electrode parts 21*b* and the second non-electrode parts 22*b*, and the secondary element eluted into the liquid phase and the sintering agent element tend to form compounds. Such compounds are, for example, $3Al_2O_3$-$2SiO_2$ and $Zn_2SiO_4$.

In one aspect, the concentration of the secondary element in the segregated parts is 5 at % or higher. In the segregated parts, the secondary element may be present in the form of compounds with the sintering agent element. The segregated parts may contain oxides of the secondary element. The concentration of the secondary element in the segregated parts refers to the atomic number ratio (at %) of the secondary element relative to the elements entering the B site of the main phase of the ceramic layer 11 (e.g., Ti element) taken at 100 at %.

In the example in FIG. 3, the segregated parts are precipitated into all the first non-electrode parts 21*b* of the first internal electrode layer 21 and all the second non-electrode parts 22*b* of the second internal electrode layer 22, but it is also possible that the segregated parts are not precipitated into some of the first non-electrode parts 21*b* and/or some of the second non-electrode parts 22*b*. The segregated parts may be precipitated to occlude the entirety of a given first non-electrode part 21*b* or second non-electrode part 22*b*, or they may be precipitated to occupy only a portion of it.

As the amount of precipitation of the segregated parts is larger, the portions of the first internal electrode layer 21 and the second internal electrode layer 22 that contribute to the generation of capacitance (i.e., the first electrode parts 21*a* and the second electrode parts 22*a*) has a smaller area, and thus the capacitance of the laminated ceramic capacitor 1 is degraded. Therefore, in order to ensure the capacitance of the laminated ceramic capacitor 1, it is desirable to define an upper limit for the amount of precipitation of the segregated parts. The amount of precipitation of the segregated parts can be obtained as follows. The laminated ceramic capacitor 1 is polished so that an LT surface can be observed. In this observation surface, the areas of the first internal electrode layers 21, the second internal electrode layers 22, and the segregated parts are measured. The amount of precipitation of the segregated parts can be expressed as the ratio of a second area, which represents the total area of the segregates parts, to a first area, which represents the total area of the first internal electrode layers 21 and the second internal electrode layers 22. As the ratio of the second area to the first area (second area/first area) is larger, the amount of precipitation of the segregated parts is larger. In one aspect, the ratio of the second area to the first area is 35% or lower.

On the other hand, if the second area of the segregated parts is small despite the addition of the sintering agent to the ceramic green sheets, the precursor of the ceramic layers 11, it means that the sintering agent remains in the ceramic layers 11. The sintering agent element and its compounds have a lower relative permittivity than the main phase oxide (e.g., barium titanate) of the ceramic green sheets. A smaller second area of the segregated parts will increase the amount of the sintering agent remaining in the ceramic layers 11, resulting in a lower capacitance of the laminated ceramic capacitor. Therefore, it is desirable to define a lower limit for the amount of precipitation of the segregated parts. In this regard, the ratio of the second area to the first area in one aspect is 5% or higher.

(1-5) First External Electrode 31 and Second External Electrode 32

In one aspect, the first and second external electrodes 31 and 32 are formed by applying a conductive paste to the body 10 and heating the conductive paste. The conductive paste can contain at least one substance from the group consisting of Ag, Pd, Au, Pt, Ni, Sn, Cu, W, Ti, and alloys of these.

(2) MANUFACTURING METHOD OF LAMINATED CERAMIC CAPACITOR 1

Figure 5:
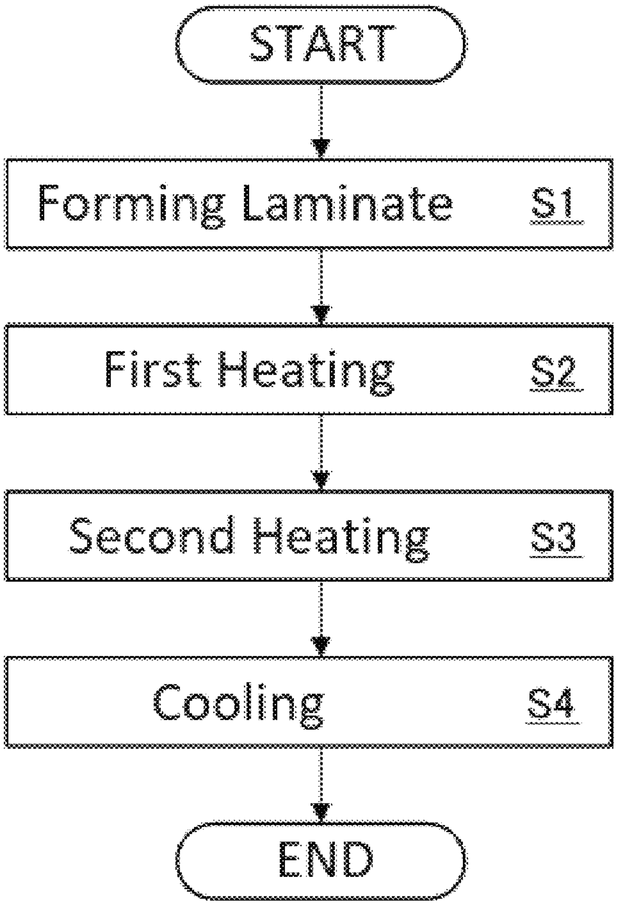
FIG. 5 is a flowchart showing a flow of a manufacturing method of a laminated ceramic capacitor according to one embodiment of the disclosure.

A description will now be given of one example of the manufacturing method of the laminated ceramic capacitor 1 with reference to FIGS. 5, 6A, and 6B. FIG. 5 is a flowchart showing a flow of a manufacturing method of the laminated ceramic capacitor according to one embodiment of the disclosure.

Here is a brief description of the manufacturing method shown in FIG. 5. In step S1, a green laminate as the precursor of the body 10 is formed. The green laminate includes ceramic green sheets, which are the precursor of the ceramic layers 11, and internal conductor patterns, which are the precursor of the first and second internal electrode layers 21 and 22. The internal conductor patterns contain a main component metal element such as Ni. The green laminate may be formed by alternately stacking ceramic green sheets each having an internal conductor pattern on the surface thereof which is the precursor of the first internal electrode layer 21, and ceramic green sheets each having an internal conductor pattern on the surface thereof which is the precursor of the second internal electrode layer 22. The ceramic green sheets contain the sintering agent. The internal conductor patterns contain a secondary element such as Al, Zn, B, and Si, in addition to the main component metal element. The internal conductor patterns may contain a third element such as Au and Fe, in addition to the above elements. Next, in step S2, the green laminate formed in step S1 is placed into a firing furnace, the temperature of the firing furnace is raised above the softening point of the sintering agent to the keeping temperature at which sintering of the main component metal element progresses in the internal electrode patterns, and the green laminate is heated at the keeping temperature for a first holding time. Next, in step S3, the temperature in the firing furnace is raised to the firing top temperature to cause sintering of the ceramic material in the ceramic green sheets. Finally, in step S4, the firing furnace is cooled to obtain the laminated ceramic capacitor 1.

The following describes each of the steps shown in FIG. 5 in more detail. First, in step S1, ceramic powder is wet-mixed with a binder such as polyvinyl butyral (PVB) resin, an organic solvent such as ethanol or toluene, a plasticizer, and a sintering agent to obtain a slurry. The sintering agent may be, for example, a low-melting glass containing $SiO_2$, $B_2O_3$, and a mixture of these. Examples of low-melting glasses include borosilicate glass and phosphate glass. Powder of $B_2O_3$ or $P_2O_5$ may be used as the sintering agent. This slurry is coated on a substrate film using, for example, the die coater or doctor blade method, and then the slurry coated on the substrate film is dried, to obtain the ceramic green sheets. The ceramic green sheets are the precursor of the ceramic layers 11.

The ceramic powder used as the raw powder of the ceramic green sheets is, for example, barium titanate powder. Barium titanate powder is synthesized by reacting titanium raw material such as titanium dioxide with barium raw material such as barium carbonate by a known method such as the solid phase method, the sol-gel method, or the hydrothermal method.

Next, an internal electrode pattern is formed on each of the ceramic green sheets formed as described above. The internal electrode patterns are formed, for example, by printing a paste for the internal electrodes on the ceramic green sheets by screen printing or other known printing methods. When the internal electrode patterns are formed by screen printing, the paste for the internal electrodes is produced by kneading and mixing a metal powder, a binder resin, and a solvent by a three-roll mill. In other words, the paste for the internal electrodes is produced by dispersing a metal powder in a binder resin. The metal powder contained in the paste for the internal electrodes may be a mixed powder produced by mixing a powder of the main component metal element such as Ni, Cu, and Sn, which is the main component of the first internal electrode layers 21 and the second internal electrode layers 22, with a powder containing a secondary element. This mixed powder may also have a powder of a third element such as Au and Fe added thereto. The mixed powder is produced by mixing the main component metal powder with the secondary element powder so that the content ratio of the secondary element to 100 at % of the main component metal element is in the range of 0.01 to 5 at %. The organic binder used in the paste for the internal electrodes may be a cellulose-based resin such as ethyl cellulose or an acrylic resin such as butyl methacrylate. The internal electrode patterns formed on some of the ceramic green sheets are the precursor of the first internal electrode layers 21, and the internal electrode patterns formed on the others of the ceramic green sheets are the precursor of the second internal electrode layers 22.

The internal electrode patterns may be formed on the ceramic green sheets by the sputtering method. The methods of forming the internal electrode patterns are not limited to those specified herein. The internal electrode patterns may be formed by various known methods, e.g., vacuum deposition, PLD (pulsed laser deposition), MO-CVD (metal organic chemical vapor deposition), MOD (metal organic decomposition), or CSD (chemical solution deposition).

As described above, a lamination unit having a ceramic green sheet and an internal electrode pattern formed on the surface of the ceramic green sheet is obtained. A predetermined number of lamination units are stacked together and thermo-compressed to form a green laminate. The top layer and the bottom layer of the green laminate may be formed of green sheets that do not have internal electrode patterns formed thereon.

Next, the green laminate is diced into pieces to obtain chip-like green laminates each being the precursor of the body 10. The chip-like green laminates may be subjected to a degreasing process. The degreasing process may be performed in an $N_2$ atmosphere. The green laminates having undergone the degreasing process may be coated with a metal paste by the dip method to form base electrode layers for the first and second external electrodes 31 and 32.

Figure 6A:
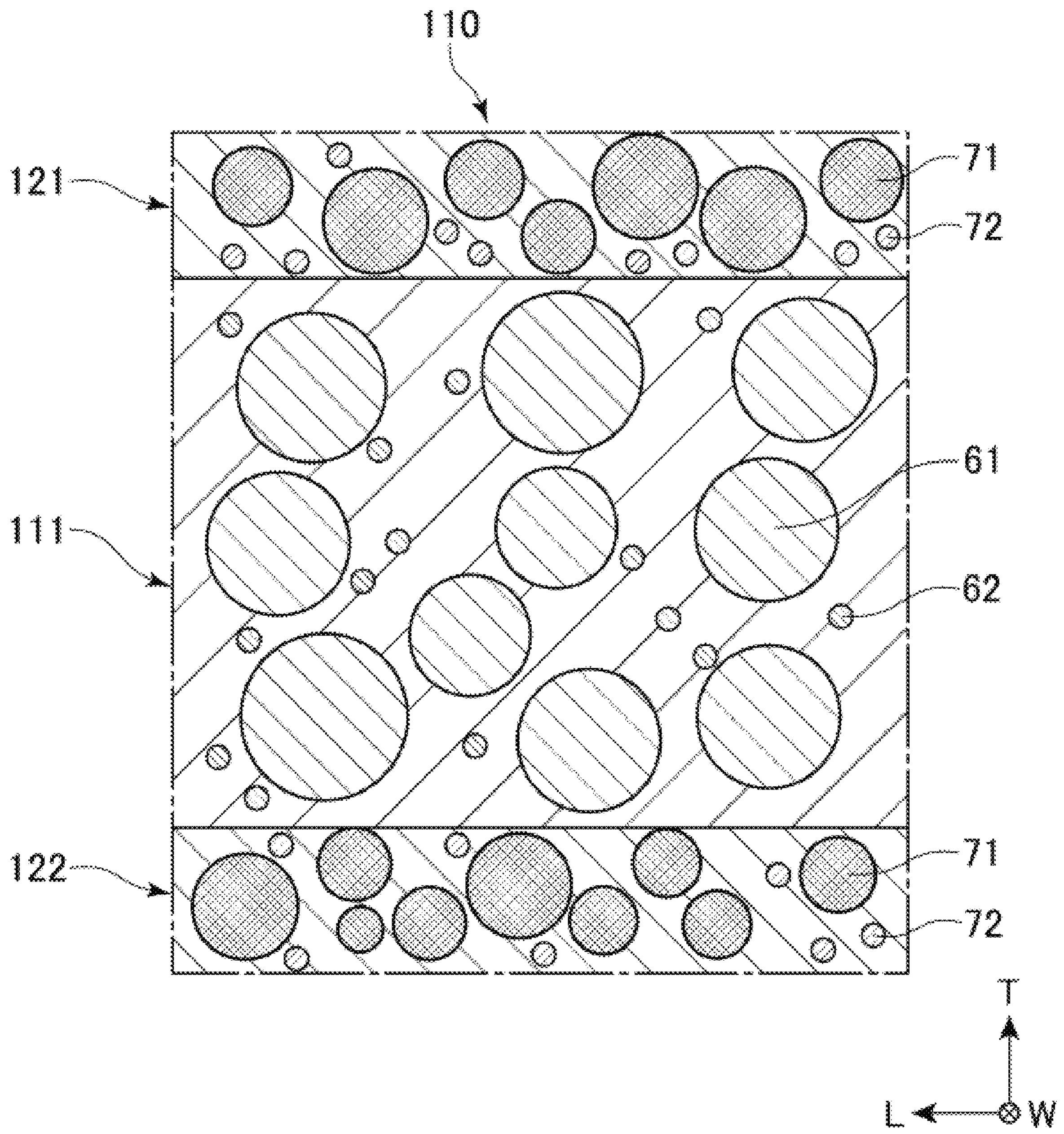
FIG. 6A is a schematic diagram illustrating a process of producing a laminated ceramic capacitor.

FIG. 6A shows an enlarged schematic cross-sectional view of a chip-like green laminate cut along the lamination direction. As shown in FIG. 6A, in the green laminate 110, an internal electrode pattern 121, which is a precursor of the first internal electrode layer 21, is provided on one side of a ceramic green sheet 111 in the lamination direction, and an internal electrode pattern 122, which is a precursor of the second internal electrode layer 22, is provided on the other side of the ceramic green sheet 111 in the lamination direction. The ceramic green sheet 111 contains ceramic powder 61 and sintering agent powder 62. The ceramic powder 61 is, for example, barium titanate powder. The sintering agent powder 62 is, for example, a low-melting glass powder containing $SiO_2$. The internal electrode patterns 121 and 122 contain main component metal element powder 71 and secondary element powder 72. The main component metal element powder 71 is, for example, Ni powder. The secondary element powder 72 is, for example, Al powder.

Next, the chip-like green laminate 110 produced in step S1 is placed into the firing furnace, and the green laminate 110 is fired in this firing furnace according to a predetermined temperature profile. The firing process causes the ceramic green sheets 111 in the green laminate 110 to be fired to form the ceramic layers 11, the internal electrode patterns 121 to be fired to form the first internal electrode layers 21, and the internal electrode patterns 122 to be fired to form the second internal electrode layers 22.

In the firing process, the temperature in the firing furnace is first raised from the room temperature to an intermediate temperature at the rate of 200 to 300° C./h. The intermediate temperature is set at slightly lower than the sintering temperature of the main component metal element. When the main component metal element is Ni, the intermediate temperature is set at about 500 to 700° C. An example of the intermediate temperature is 600° C.

Next, in step S2, the temperature of the firing furnace is raised from the intermediate temperature to the keeping temperature. The temperature in the firing furnace is held at the keeping temperature for the first holding time. In other words, in step S2, the green laminate is heated at the keeping temperature for the first holding time (first heating step). The keeping temperature is higher than the softening point of the sintering agent, and the sintering of the main component metal element in the internal electrode patterns progresses at the keeping temperature. The keeping temperature may vary depending on the type of the sintering agent and the type of the main component metal element. When the sintering agent is a low-melting glass mainly composed of $SiO_2$ and the main component metal element is Ni, the keeping temperature may be 1000° C. By holding the green laminate at the keeping temperature, the sintering agent softens to form the liquid phase, and the sintering of the main component metal element starts in the internal electrode patterns. In step S2, the main component metal element is partly formed into a spherical shape with the progress of the sintering, and the internal electrode patterns partly become discontinuous. The discontinuities of the internal electrode patterns form the first non-electrode parts 21*b* and the second non-electrode parts 22*b* in the finished laminated ceramic capacitor 1. In step S2, the liquid-phase sintering agent flows into the discontinuities of the internal electrode patterns. The first holding time is defined as an amount of time sufficient for the liquid-phase sintering agent to flow into the discontinuities of the internal electrode patterns, for example, 10 to 60 minutes. The first holding time is, for example, 30 minutes.

In the first heating step (step S2), the secondary element contained in the internal electrode patterns migrates to the surface of the internal electrode patterns by thermal diffusion and is eluted into the liquid-phase sintering agent that has flown into the discontinuities of the internal electrode patterns. In the liquid-phase sintering agent, the main component of the sintering agent and the secondary element eluted into the sintering agent form compounds.

After heating for the first holding time in step S2, the temperature in the firing furnace is raised to the firing top temperature in step S3. The temperature in the firing furnace is held at the firing top temperature for the second holding time. In other words, in step S3, the green laminate is heated at the firing top temperature for the second holding time (second heating step). The firing top temperature is, for example, 1100 to 1200° C. The second holding time for the firing top temperature should be within ten minutes to prevent excessive sintering of the main component metal element in the internal electrode layers. Cooling may start immediately after the top firing temperature is reached.

In the second heating step described above, the green laminate 110 is heated to the firing top temperature, whereby the green laminate 110 is fired to form the body 10. FIG. 6B shows an enlarged schematic cross-sectional view along the lamination direction of the body 10 obtained by heating the green laminate 110 to the firing top temperature and holding it at the firing top temperature for the second holding time. FIG. 6B shows the body 10 having undergone the firing top temperature and yet to be cooled.

Figure 6B:
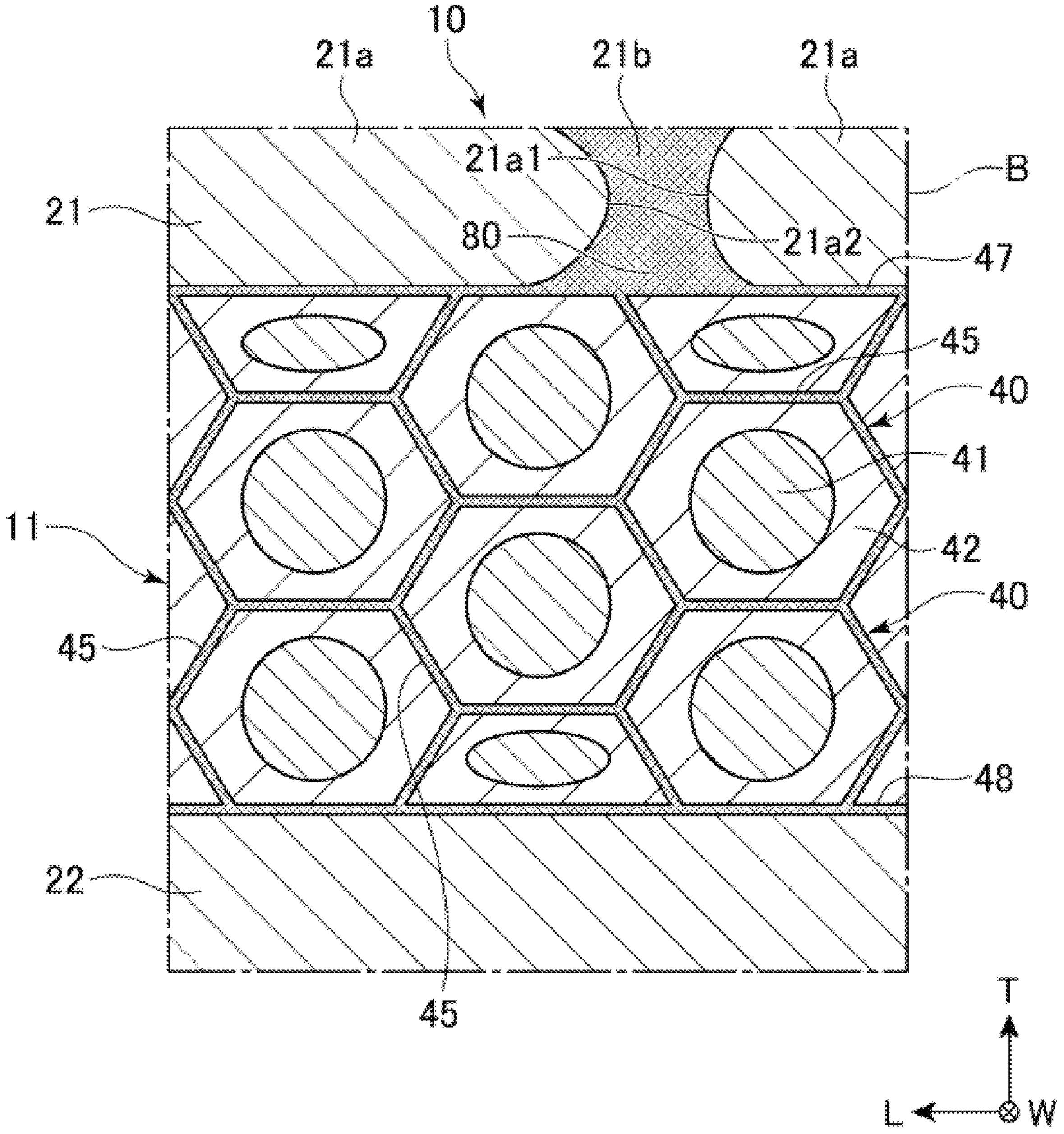
FIG. 6B is a schematic diagram illustrating a process of producing the laminated ceramic capacitor.

In the body 10 shown in FIG. 6B, the ceramic powder 61 in the green laminate 110 is sintered through the firing process in step S2 to form the crystal grains 40 each having the core portion 41 and the shell portion 42. When the ceramic powder 61 contains additive elements such as rare earth elements, the additive elements diffuse into the shell portion 42 during the firing process. Therefore, the additive elements in the ceramic powder 61 are contained in higher concentrations in the shell portion 42 than in the core portion 41. In the ceramic layers 11, the crystal grains 40 are densely arranged. Adjacent ones of the crystal grains 40 are separated from each other by grain boundaries 45. During the firing process, the sintering agent powder 62 in the ceramic green sheets 111 is present in the form of a liquid-phase component 80.

The liquid-phase component 80 formed by the melting of the sintering agent powder in the second heating step spreads to the surface of the ceramic powder 61 to promote the sintering of the ceramic powder 61. In the body 10, the liquid-phase component 80 spreads to the surfaces of the crystal grains formed by the sintering of the ceramic powder 61, so that the grain boundaries 45 in the body 10 are filled with the liquid-phase component 80, as shown in FIG. 6B. The elements contained in the ceramic powder 61 (Ba and Ti, if the ceramic powder is barium titanate powder) are eluted into the liquid-phase component 80. During the firing process, the crystal grains 40 grow as the elements eluted into the liquid-phase component 80 precipitate on the crystal surfaces. In addition, as the rearrangement of the crystal grains 40 in the liquid-phase component 80 progresses, the crystal grains 40 are densified.

The liquid-phase component 80 spreads from the grain boundaries 45 through the first interface layer 47 to the regions between the internal electrodes (in the example shown, the region within the first non-electrode part 21*b* of the first internal electrode layer 21). The first non-electrode parts 21*b* may be entirely filled with the liquid-phase component 80, or they may be partly filled with the liquid-phase component 80. When the second non-electrode parts 22*b* are formed in the second internal electrode layer 22, the liquid-phase component 80 may spread to the second non-electrode parts 22*b* through the second interface layer 48. Since the first internal electrode layer 21 and the second internal electrode layer 22 contain a secondary element that easily forms compounds with the sintering agent element contained in the liquid-phase component, the liquid-phase component 80 does not accumulate in the grain boundaries 45, the first interface layer 47, and the second interface layer 48, but migrates toward the first non-electrode parts 21*b* and the second non-electrode parts 22*b*.

In the second heating step (step S3), the sintering of the main component metal element in the internal electrode patterns 121 and 122 also progresses further. The main component metal element is partly formed into a spherical shape with the progress of the sintering, and the first internal electrode layer 21 and the second internal electrode layer 22 partly become discontinuous. FIG. 6B shows the first non-electrode part 21*b* formed when the main component metal element in the first internal electrode layer 21 is partly formed into a spherical shape. As the sintering of the main component metal element progresses, the sintered compact of the main component metal element grows convex toward the first non-electrode part 21*b*. The liquid-phase component 80 that fills the first non-electrode part 21*b* is highly fluid, and thus it flows in the body 10 as the sintered compact of the main component metal element grows. Thus, in the second heating step, the first non-electrode part 21*b* is filled with the liquid-phase component 80, and therefore, the main component metal element in the first internal electrode layer 21 can grow to have a convex surface toward the first non-electrode part 21*b*.

Figure 7:
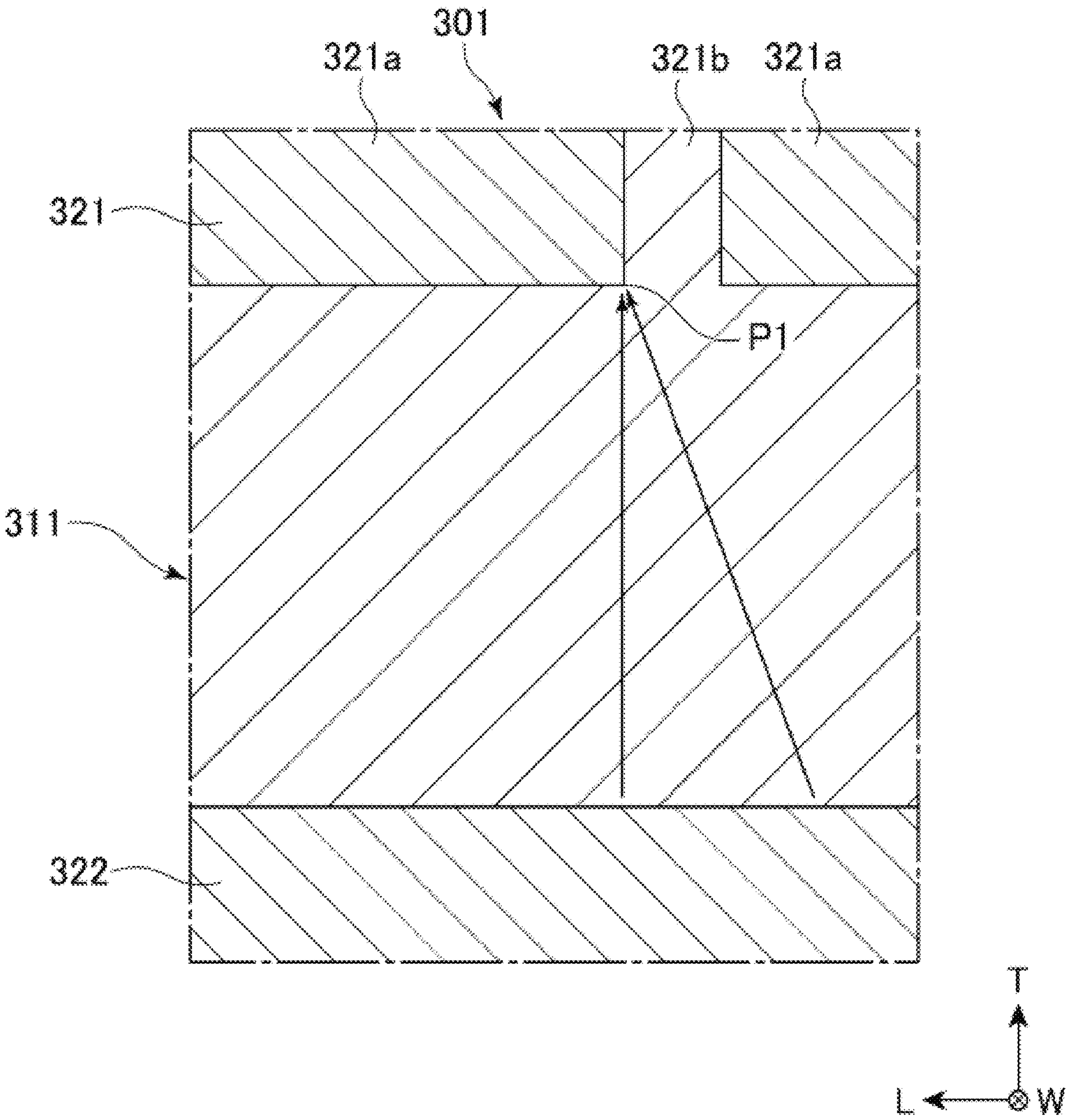
Fig. 7 (Related Art)
FIG. 7 is a schematic cross-sectional view of a conventional laminated ceramic capacitor with ceramic layers penetrating into non-electrode parts.

FIG. 7 shows an enlarged cross-sectional view of a conventional laminated ceramic capacitor 301. The conventional laminated ceramic capacitor 301 includes a first internal electrode layer 321, a second internal electrode layer 322, and a ceramic layer 311 disposed between these layers. In FIG. 7, the crystal grains in the ceramic layer 311 are not shown for simplicity of illustration. The first internal electrode layer 321 includes an electrode part 321*a* and a non-electrode part 321_b_. In the manufacturing process of the conventional laminated ceramic capacitor 301, the liquid-phase component does not flow into the non-electrode part 321_b_, and thus the non-electrode part 321_b_ is initially a void as the sintering of the main component metal element progresses. When the firing temperature is raised further to progress the sintering of the ceramic particles, the sintered compact of the ceramic particles grow also in the non-electrode part 321_b_, which is a void. Therefore, as shown in FIG. 7, the non-electrode part 321_b_ is filled with the sintered compact of the ceramic particles that is less fluid, as with the ceramic layer 311, and the sintered compact of the main component metal element cannot take a convex shape toward the non-electrode part 321_b_. Therefore, as shown in FIG. 7, the interface between the electrode part 321_a_ and the non-electrode part 321_b_ will take a flat shape. Thus, when voltage is applied between the first internal electrode layer 321 and the second internal electrode layer 322, the electric field tends to concentrate at the vertex P1 where the interface between the electrode part 321_a_ and the non-electrode part 321_b_ intersects the interface between the electrode part 321_a_ and the ceramic layer 311. This concentration of electric field can shorten the service life of the laminated ceramic capacitor.

In contrast, in the laminated ceramic capacitor 1 according to the embodiment of the present invention, as shown in FIGS. 4 and 6B, when the main component metal element sinters, the first non-electrode part 21_b_ is filled with the liquid-phase component 80 that is highly fluid, so that the sintered compact of the main component metal element can grow convex toward the first non-electrode part 21_b_. Therefore, the interface between the first electrode part 21_a_ and the first non-electrode part 21_b_ has a convex shape toward the first non-electrode part 21_b_. Thus, in the laminated ceramic capacitor 1 according to the embodiment of the present invention, the concentration of the electric field that occurs in the conventional laminated ceramic capacitor shown in FIG. 7 is mitigated, resulting in a longer service life of the laminated ceramic capacitor 1.

In step S3, the laminate is held at the keeping temperature for the second holding time, and then in step S4, the firing furnace is cooled to the room temperature to obtain the laminated ceramic capacitor 1. The cooling in step S4 causes the liquid-phase component 80 in the body 10 to solidify to form a secondary phase. The secondary phase contains the sintering agent element. As the liquid-phase component 80 is cooled, the elements of the main phase components (e.g., Ba and Ti) that have been eluted into the liquid-phase component 80 precipitate in the form of oxides (such as BaO and $TiO_2$) for example, in the regions between the internal electrodes, the first interface layer 47, the second interface layer 48, and the grain boundaries 45.

Processes not shown in the flowchart of FIG. 5 may be performed to produce the laminated ceramic capacitor 1. For example, the laminated ceramic capacitor 1 obtained through the second heat treatment in step S3 may be subjected to re-oxidation treatment at 600° C. to 1000° C. in an $N_2$ gas atmosphere. A plating layer of Cu, Ni, Sn, etc. may be provided on the surfaces of the first and second external electrodes 31 and 32. This plating layer can be formed by the electrolytic or electroless plating method.

A part of the steps shown in the flowchart of FIG. 5 may be omitted to produce the laminated ceramic capacitor 1. For example, the first heating step (step S2) may be omitted. When the first heating step is omitted, the temperature is increased at a predetermined rate from the intermediate temperature to the firing top temperature. Even if the first heating step (step S2) is omitted, the liquid-phase component 80 can be drained into the first non-electrode part 21_b_ and the second non-electrode part 22_b_ by having the internal electrode patterns, which are the precursor of the first internal electrode layer 21 and the second internal electrode layer 22, contain a secondary element that easily forms compounds with the sintering agent element. However, when the internal electrode pattern does not contain such a secondary element, the first heating step is performed to progress the sintering of the main component metal element contained in the internal electrode patterns and to spread the liquid-phase sintering agent to the discontinuities of the internal electrode patterns.

(3) EXAMPLES

The invention will now be further described in detail based on examples. The invention is not limited to the following examples.

(3-1) Preparation of Samples

First, 17 different samples were prepared according to the manufacturing method shown in FIG. 5, as follows. Specifically, a slurry was first obtained by wet-mixing barium titanate powder with polyvinyl butyral (PVB) resin, a solvent, a plasticizer, and a sintering agent powder. The sintering agent powder was weighed so that the content ratio of the main component of the sintering agent powder (sintering agent element) to 100 at % of Ti was the amount listed under "Amount of Sintering Agent Added" in Table 1, and the weighed sintering agent powder was mixed with the barium titanate powder. For example, in preparing Sample 1, a low-melting glass powder composed mainly of $SiO_2$ was weighed so that Si was 0.1 at % relative to 100 at % of Ti contained in the barium titanate powder, and the weighed low-melting glass powder composed mainly of $SiO_2$ was mixed with the barium titanate powder. In preparing Sample 9, the barium titanate powder was mixed with a $B_2O_3$ powder. In preparing sample 10, the barium titanate powder was mixed with a $P_2O_5$ powder.

The slurry thus formed was coated on a substrate film, and then the slurry coated on the substrate film was dried to obtain the ceramic green sheets. Next, mixed powders were prepared by mixing Ni powder, which is the main component metal element, with the secondary element powders containing the secondary elements listed in Table 1. No secondary element was mixed for preparation of samples 12 and 13. Each of the secondary element powders was weighed so that the ratio of the secondary element to 100 at % of Ni was the amount listed under "Amount of Secondary Element Added" in Table 1, and the weighed secondary element powder was mixed with the Ni powder. Next, the mixed powder was wet-mixed with polyvinyl butyral (PVB) resin, a solvent, and a plasticizer to obtain a slurry for the internal electrodes. Then, the slurry for the internal electrodes was printed on a part of the surfaces of the ceramic green sheets to form an internal electrode pattern on each of the ceramic green sheets, thus forming a lamination unit. This lamination unit has the ceramic green sheet and the internal electrode pattern formed on the surface of the ceramic green sheet.

TABLE 1

| Sample No. | Sintering Agent Element | Amount of Sintering Agent Added (at %) | Secondary Element | Amount of Secondary Element Added (at %) |
|---|---|---|---|---|
| 1 | Si | 0.1 | Al | 0.1 |
| 2 | Si | 1 | Al | 0.1 |
| 3 | Si | 1 | Al | 1 |
| 4 | Si | 1 | Al | 5 |
| 5 | Si | 5 | Al | 5 |
| 6 | Si | 8 | Al | 8 |
| 7 | Si | 10 | Al | 10 |
| 8 | Si | 1 | Zn | 1 |
| 9 | Si | 1 | B | 1 |
| 10 | B | 1 | Si | 1 |
| 11 | P | 1 | Zn | 1 |
| 12 | Si | 1 | — | — |
| 13* | Si | 1 | — | — |
| 14* | Si | 1 | Al | 10 |
| 15* | Si | 12 | Al | 12 |
| 16* | Si | 1 | Pt | 1 |
| 17* | Si | 0.05 | Al | 0.05 |

Next, 500 lamination units were stacked together to form a laminate, which was then diced into chip-like green laminates (chip laminates). The chip laminates had the 1005 shape (length: 1.0 mm, width: 0.5 mm, height: 0.5 mm). Next, the chip laminates were degreased in an $N_2$ atmosphere. Next, the base layers of the external electrodes were formed on each of the chip laminates by applying metal paste to the degreased compact by the dip method.

Next, the chip laminates obtained as described above, or the precursor of the samples, were put into the firing furnace, and the chip laminates were fired according to a predetermined temperature profile and under predetermined firing conditions. In firing samples 1 to 11, 13 to 15, and 17, the inside of the firing furnace was maintained at a low oxygen atmosphere with an oxygen partial pressure of 10-10 Mpa, the temperature inside the firing furnace was increased from room temperature to 600° C. at a rate of 300° C./h and then increased from 600° C. to 1200° C. at a rate of 1000° C./h, and the firing top temperature of 1200° C. was held for five minutes (second holding time). In firing sample 12, the temperature in the firing furnace was raised from the intermediate temperature to 1000° C. (keeping temperature), the chip laminate was heated at the keeping temperature for 30 minutes (first holding time), and after the first holding time has elapsed, the temperature in the firing furnace was raised to 1200° C., the firing top temperature. After holding the firing top temperature for five minutes, the inside of the firing furnace was cooled.

Samples 1 to 17 of the laminated ceramic capacitor were prepared in the above manner. In samples 1 to 17, the ceramic green sheets were fired to form the ceramic layers, and the internal electrode patterns were fired to form the internal electrode layers.

Samples 1 to 17 were encapsulated in a resin, and each sample encapsulated in the resin was polished along a plane parallel to the lamination direction (e.g., the LT plane in FIG. 2) to expose a cross-section parallel to the lamination direction, and this exposed cross-section was observed using a field emission scanning secondary electron microscope (FE-SEM) at a magnification of 20,000. This observation confirmed that the crystal grains were densified in all of samples 1 to 16. Thus, samples 1 to 16 were sintered at a low densification temperature of 1200° C. In sample 17, the crystal grains were not densified.

(3-2) Observation of Segregated Parts and Area Ratio

Next, for each of samples 1 to 16, the observation surface exposed by polishing was observed using a field emission scanning secondary electron microscope (FE-SEM) equipped with an energy dispersive X-ray spectrometer (EDS), and the regions that appear bright in the SEM image by contrast differences were identified as the electrode parts (the first electrode parts 21*a* or the second electrode parts 22*a*) of the internal electrode layer. In the above observation surface, an observation region having a size of 50 μm square was set to include five internal electrode layers, and EDS mapping was performed on this observation region to examine the distribution of Ni, Ba, Ti, the sintering agent element, and the secondary element. The field emission scanning secondary electron microscope used was FE-SEM (SU7000) from Hitachi High-Technologies Corporation. The EDS detector used was Quantax from BRUKER Corporation.

In the mapping data thus obtained, the regions between the internal electrodes where the concentration of the sintering agent element is 20 at % or higher were identified as segregated parts. Among the quantitative elements, the regions with the highest concentration of the Ni element were identified as the first or second electrode parts 21*a* or 22*a*. Next, image processing was performed on the mapping data using ImageJ, image processing software, to calculate the first area, which represents the sum of the area of the first internal electrode layers 21 and the area of the second internal electrode layers 22, and the second area, which represents the area of the segregated parts, and calculate the ratio of the second area to the first area. The ratio of the second area to the first area calculated in this way is listed in the column of "Area Ratio" in Table 2 below.

(3-3) Continuity

The continuity of the internal electrode layer was calculated for each sample as follows. For each of the internal electrode layers included in each of the above observation regions, the electrode parts (the first electrode parts 21*a* or the second electrode parts 22*a*) were identified based on the contrast difference, and the length of each of these electrode parts was measured at the center thereof in the thickness direction (T-axis direction). The continuity ratio for each internal electrode layer was then calculated based on the measured lengths of the electrode parts. The continuity of the internal electrode layer thus calculated is listed in the column of "Continuity" in Table 2. Since the segregated parts may occupy only a portion, rather than the entirety, of each of the first non-electrode parts 21*b*, and similarly, the segregated parts may occupy only a portion, rather than the entirety, of each of the second non-electrode parts 22*b*, an increase in the continuity does not immediately result in an increase in the area ratio.

(3-4) Capacitance

The capacitance was measured for each of samples 1 to 16. After each sample was left at 150° C. for one hour and then left under standard conditions for 24 hours, the capacitance was measured using an LCR meter at room temperature, with a measurement voltage of 0.5 V and a frequency of 1 kHz. One hundred samples were selected for each of samples 1 to 16, and the capacitance was determined for each of these 100 samples. The average of the capacitances measured for the 100 samples was calculated for each of samples 1 to 16, and this calculated average was used as the capacitance of the sample. The capacitance calculated in this way is listed in the column of "Initial Capacitance" in Table 2.

(3-5) HALT

One hundred samples were selected for each of samples 1 to 16, and an accelerated life test (HALT) was performed on each of these selected samples. In the accelerated life test, a voltage of 6.3 V/μm was applied for 1000 hours at 85° C. to each of 100 samples selected for each of samples 1 to 16. The voltage was also applied for 2000 hours under the same conditions to each of another 100 samples selected for each of samples 1 to 16. The insulation resistance of these samples was measured after they were left at room temperature for 24 hours following the application of voltage. In this measurement, samples with insulation resistance less than 10 MΩ were determined to be defective. Samples for which not a single defect occurred after 2000 hours of voltage application were determined to have an excellent service life, and marked with "Excellent" in the column of "Life" in Table 2. Samples for which not a single defect occurred after 1000 hours of voltage application, but a defective sample was found after 2000 hours of application, were determined to have a good service life, and marked with "Good" in the column of "Life" in Table 2.

TABLE 2

| Sample No. | Area Ratio (%) | Continuity (%) | Initial Capacitance (μF) | Life |
|---|---|---|---|---|
| 1 | 5% | 93% | 22 | Good |
| 2 | 6% | 92% | 22 | Good |
| 3 | 9% | 93% | 22 | Excellent |
| 4 | 11% | 91% | 22 | Excellent |
| 5 | 13% | 92% | 22 | Good |
| 6 | 14% | 91% | 22 | Excellent |
| 7 | 16% | 90% | 21 | Excellent |
| 8 | 9% | 92% | 22 | Excellent |
| 9 | 9% | 92% | 22 | Excellent |
| 10 | 10% | 92% | 22 | Excellent |
| 11 | 9% | 92% | 22 | Excellent |
| 12 | 10% | 92% | 22 | Excellent |
| 13* | 0% | 93% | 15 | Poor |
| 14* | 38% | 76% | 17 | Excellent |
| 15* | 39% | 72% | 17 | Excellent |
| 16* | 0% | 93% | 15 | Poor |
| 17* | N/A | N/A | N/A | N/A |

In Table 2, the samples not encompassed by the present invention (i.e., comparative examples) have an asterisk (*) added to the sample number. Specifically, samples 13 to 17 are comparative examples not encompassed by the present invention. In sample 17, a densified ceramic layer could not be obtained at the firing top temperature of 1200° C., and therefore, sample 17 was not evaluated for the area ratio, continuity, initial capacitance, and service life.

The above experimental results confirmed that the capacitance of samples 1 to 12, in which segregated parts are precipitated into the regions between the internal electrodes, is 21 μF to 22 μF, and thus samples 1 to 12 all have an excellent capacitance compared to samples 13 and 16 (with a capacitance of 15 μF), in which no segregated parts are precipitated. In sample 13, the internal electrode patterns, which are the precursor of the internal electrode layers, contain no secondary element, and the step of holding the keeping temperature (first heating step) was not performed in the manufacturing process, and therefore, much of the sintering agent contained in the ceramic green sheets remained in the ceramic layers 11, which resulted in the low capacitance. On the other hand, in samples 1 to 11, the secondary element that easily form compounds with the sintering agent element is added to the internal electrode patterns at a ratio of 0.1 at % to 10 at %, and therefore, the liquid-phase sintering agent flowed into the regions between the internal electrodes during preparation of the samples, and the content of the sintering agent element with a low dielectric constant in the ceramic layers 11 is reduced, resulting in an improved capacitance. In sample 12, no secondary element is added to the internal electrode patterns, but the step of holding the keeping temperature (first heating step) was performed during the manufacturing process, and therefore, the liquid-phase sintering agent flowed into the regions between the internal electrodes during the first heating step, resulting in an improved capacitance.

All of samples 1 to 12 achieved a good service life. On the other hand, samples 13 and 16, where no segregated parts were precipitated, achieved a reduced service life compared to samples 1 to 12. In samples 13 and 16, the liquid-phase sintering agent did not flow into the regions between the internal electrodes during the manufacturing process, so that some of the internal electrode layers have a peak formed therein as shown in FIG. 7, and the electric field was concentrated at these peaks, which reduced the service life. On the other hand, in samples 1 to 12, the precipitation of the segregated parts into the regions between the internal electrodes was observed, indicating that liquid phase component flowed into the regions between the internal electrodes during manufacturing. Therefore, in samples 1-12, the interface between the electrode part (e.g., the first electrode part 21*a*) and the non-electrode part (e.g., the first non-electrode part 21*b*) is curved, and thus the concentration of the electric field in the internal electrode layers is mitigated. In other words, a good service life was achieved in samples 1 to 12 since the concentration of the electric field was mitigated.

In sample 14, the internal electrode patterns contain a high content (10 at %) of Al as a secondary element, while the amount of sintering agent element added to 100 at % of Ti is about 1 at %, so that solid-phase $Al_2O_3$ was precipitated into the non-electrode parts, and the solid-phase $Al_2O_3$ reduced the continuity.

In sample 15, a large amount of sintering agent was added, and as much as 12 at % secondary element (Al) was added to the internal electrode patterns. Therefore, sintering of the Ni element in the internal electrode patterns progressed excessively due to the sintering agent flowing into the regions between the internal electrodes, resulting in a lower continuity. The lower continuity led to a reduced capacitance.

As shown above, the capacitance is reduced to 15 to 17 μF for samples 14 and 15, which have an area ratio of 38 or higher. Thus, it can be seen that excessive precipitation of the segregated parts leads to a reduced capacitance. An excellent capacitance can be obtained by adjusting the amount of precipitation of the segregated parts so that the area ratio is 35% or lower.

Although experimental results are not described herein, it was observed that even with B or P used as a sintering agent element instead of Si, a reduction in capacitance occurred when the area ratio exceeded 35%. The precipitation of the segregated parts into the regions between the internal electrodes can reduce the amount of sintering agent contained in the ceramic layers 11 and thus increase the capacitance. However, under the conditions under which the area ratio is 35% or higher, the segregated parts are precipitated excessively, resulting in a low continuity of the internal electrode layers, which causes a reduced capacitance. Therefore, it is desirable to allow the segregated parts to be precipitated into the regions between the internal electrodes so that the area ratio is 35% or lower.

(4) NOTES

The dimensions, materials, and arrangements of the constituent elements described for the above various embodiments are not limited to those explicitly described for the embodiments, and these constituent elements can be modified to have any dimensions, materials, and arrangements within the scope of the present invention.

Constituent elements not explicitly described herein can also be added to the above-described embodiments, and it is also possible to omit some of the constituent elements described for the embodiments.

The words "first," "second," "third" and so on used herein are added to distinguish constituent elements but do not necessarily limit the numbers, orders, or contents of the constituent elements. The numbers added to distinguish the constituent elements should be construed in each context. The same numbers do not necessarily denote the same constituent elements among the contexts. The use of numbers to identify constituent elements does not prevent the constituent elements from performing the functions of the constituent elements identified by other numbers.

The expression of "including" a constituent element used herein does not exclude other constituent elements but rather means that other constituent elements can be further included, as long as they are consistent with the invention.

(5) ADDITIONAL EMBODIMENTS

Embodiments disclosed herein also include the following.

Additional Embodiment 1

A laminated ceramic capacitor, comprising:

a body having a first internal electrode layer, a second internal electrode layer, and a ceramic layer disposed between the first internal electrode layer and the second internal electrode layer in a lamination direction, the first internal electrode layer containing a main component metal element, the ceramic layer being formed of ceramic material containing a sintering agent composed mainly of a sintering agent element;

a first external electrode provided on the body so as to be electrically connected to the first internal electrode layer; and a second external electrode provided on the body so as to be electrically connected to the second internal electrode layer, wherein the first internal electrode layer includes a first electrode part and a first non-electrode part, the first electrode part being formed of a sintered compact of the main component metal element, the first non-electrode part being surrounded by the first electrode part, wherein the second internal electrode layer includes a second electrode part and a second non-electrode part, the second electrode part being formed of a sintered compact of the main component metal element, the second non-electrode part being surrounded by the second electrode part, wherein each of the first non-electrode part and the second non-electrode part has a segregated part containing the sintering agent element, and wherein in a cross section of the body cut along the lamination direction, a ratio of a second area to a first area is 35% or lower, the first area representing a sum of an area of the first internal electrode layer and an area of the second internal electrode layer, the second area representing an area of the segregated part.

Additional Embodiment 2

The laminated ceramic capacitor of Additional Embodiment 1, wherein the ratio of the second area to the first area is 5% or higher.

Additional Embodiment 3

The laminated ceramic capacitor of Additional Embodiment 1 or 2, wherein a concentration of the sintering agent element in the segregated part is 20 at % or higher.

Additional Embodiment 4

The laminated ceramic capacitor of any one of Additional Embodiments 1 to 3, wherein the first internal electrode layer further contains a secondary element, and wherein the secondary element is at least one element selected from the group consisting of Al, Zn, B, and Si.

Additional Embodiment 5

The laminated ceramic capacitor of Additional Embodiment 4, wherein the segregated part contains the secondary element.

Additional Embodiment 6

The laminated ceramic capacitor of Additional Embodiment 5, wherein a concentration of the secondary element in the segregated part is 5 at % or higher.

Additional Embodiment 7

The laminated ceramic capacitor of any one of Additional Embodiments 1 to 6, wherein the ceramic layer contains a plurality of crystal grains each formed of a sintered compact of the ceramic material, and wherein in the ceramic layer, a number of the crystal grains interposed between the first internal electrode layer and the second internal electrode layer is three or less.

Additional Embodiment 8

The laminated ceramic capacitor of any one of Additional Embodiments 1 to 7, wherein the sintering agent is a low-melting glass.

Additional Embodiment 9

The laminated ceramic capacitor of any one of Additional Embodiments 1 to 7, wherein the low-melting glass contains at least one substance selected from the group consisting of $SiO_2$, $B_2O_3$, and mixtures of these.

Additional Embodiment 10

The laminated ceramic capacitor of Additional Embodiment 8, wherein the low-melting glass is borosilicate glass or phosphate glass.

Additional Embodiment 11

The laminated ceramic capacitor of any one of Additional Embodiments 1 to 7, wherein the sintering agent is $B_2O_3$ powder, $P_2O_5$ powder, or a mixture of these.

Additional Embodiment 12

A circuit module comprising the laminated ceramic capacitor of any one of Additional Embodiments 1 to 11.

Additional Embodiment 13

An electronic device comprising the circuit module of Additional Embodiment 12.

Additional Embodiment 14

A method of manufacturing a laminated ceramic capacitor, the method comprising:

a preparation step of preparing a green laminate, the green laminate including a ceramic green sheet and internal electrode patterns, the ceramic green sheet containing a sintering agent, the internal electrode patterns being provided on a first surface and a second surface of the ceramic green sheet and containing a main component metal element;

a first heating step of heating the green laminate for a first holding time at a keeping temperature at which sintering of the main component metal element occurs, the keeping temperature being higher than a softening point of the sintering agent; and a second heating step of heating, after the first heating step, the green laminate at a firing top temperature higher than the keeping temperature.

Additional Embodiment 15

The method of Additional Embodiment 14, wherein the internal electrode patterns contain a secondary element, the secondary element being at least one element selected from the group consisting of Al, Zn, B, and Si.

What is claimed is:

1. A laminated ceramic capacitor, comprising:

a body having a first internal electrode layer, a second internal electrode layer, and a ceramic layer disposed between the first internal electrode layer and the second internal electrode layer in a lamination direction, the first internal electrode layer containing a main component metal element, the ceramic layer being formed of ceramic material containing a sintering agent composed mainly of a sintering agent element;

a first external electrode provided on the body so as to be electrically connected to the first internal electrode layer; and a second external electrode provided on the body so as to be electrically connected to the second internal electrode layer, wherein the first internal electrode layer includes a first electrode part and a first non-electrode part, the first electrode part being formed of a sintered compact of the main component metal element, the first non-electrode part being surrounded by the first electrode part, wherein the second internal electrode layer includes a second electrode part and a second non-electrode part, the second electrode part being formed of a sintered compact of the main component metal element, the second non-electrode part being surrounded by the second electrode part, wherein each of the first non-electrode part and the second non-electrode part has a segregated part containing the sintering agent element, and wherein in a cross section of the body cut along the lamination direction, a ratio of a second area to a first area is 35% or lower, the first area representing a sum of an area of the first internal electrode layer and an area of the second internal electrode layer, the second area representing an area of the segregated part, wherein a concentration of the sintering agent element in the segregated part is 20 at % or higher.

2. The laminated ceramic capacitor of claim 1, wherein the ratio of the second area to the first area is 5% or higher.

3. The laminated ceramic capacitor of claim 1, wherein the first internal electrode layer further contains a secondary element, and wherein the secondary element is at least one element selected from the group consisting of Al, Zn, B, and Si.

4. The laminated ceramic capacitor of claim 3, wherein the segregated part contains the secondary element.

5. The laminated ceramic capacitor of claim 4, wherein a concentration of the secondary element in the segregated part is 5 at % or higher.

6. The laminated ceramic capacitor of claim 1, wherein the ceramic layer contains a plurality of crystal grains each formed of a sintered compact of the ceramic material, and wherein in the ceramic layer, a number of the crystal grains interposed between the first internal electrode layer and the second internal electrode layer is three or less.

7. The laminated ceramic capacitor of claim 1, wherein the sintering agent is a low-melting glass.

8. The laminated ceramic capacitor of claim 7, wherein the low-melting glass contains at least one substance selected from the group consisting of $SiO_2$, $B_2O_3$, and mixtures of these.

9. The laminated ceramic capacitor of claim 7, wherein the low-melting glass is borosilicate glass or phosphate glass.

10. The laminated ceramic capacitor of claim 1, wherein the sintering agent is $B_2O_3$ powder, $P_2O_5$ powder, or a mixture of these.

11. A circuit module comprising the laminated ceramic capacitor of claim 1.

12. An electronic device comprising the circuit module of claim 11.

* * * * *